Dec. 5, 1939.  F. G. G. ARMSTRONG  2,182,271
HYDRAULIC SHOCK ABSORBER AND THE LIKE DAMPING MEANS
Filed May 23, 1938  3 Sheets-Sheet 1
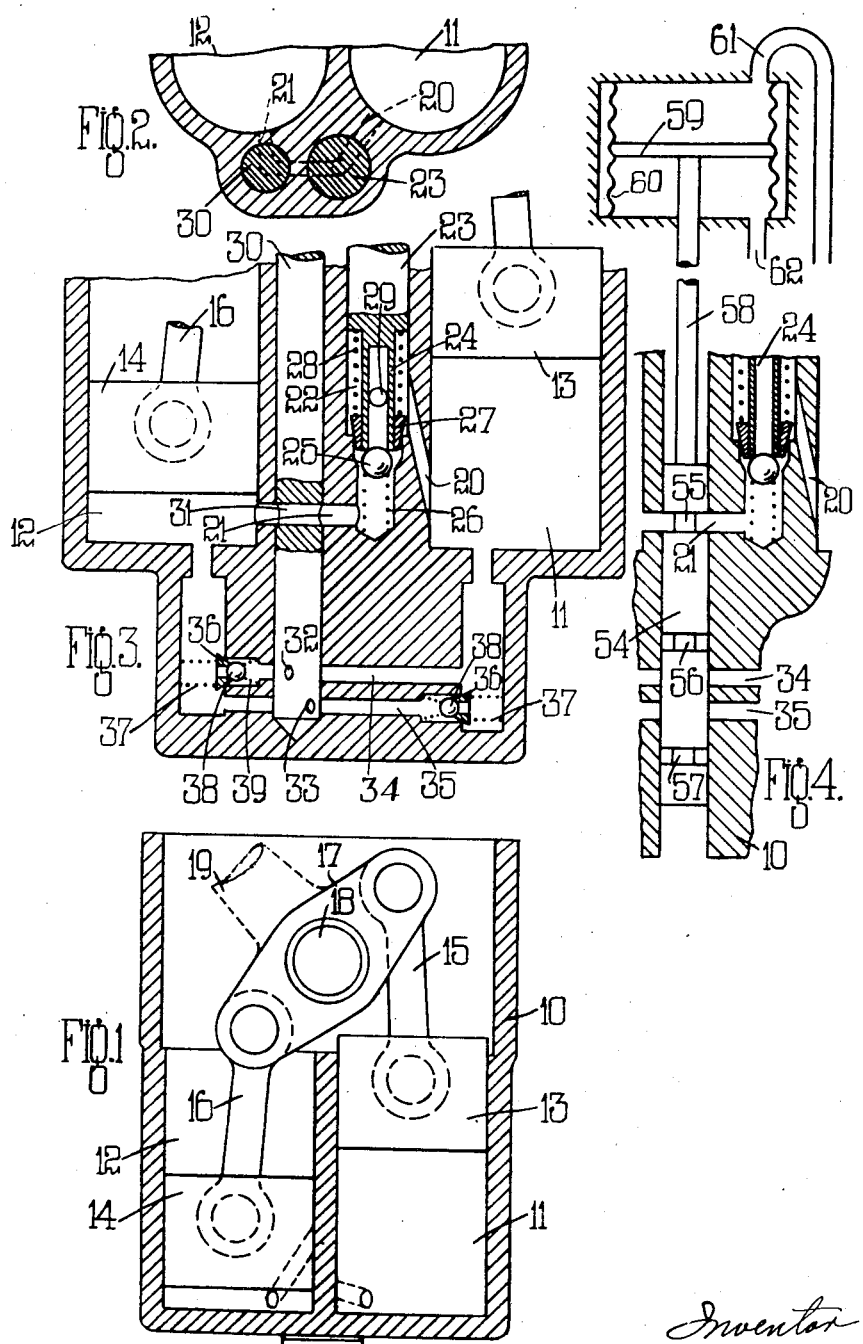

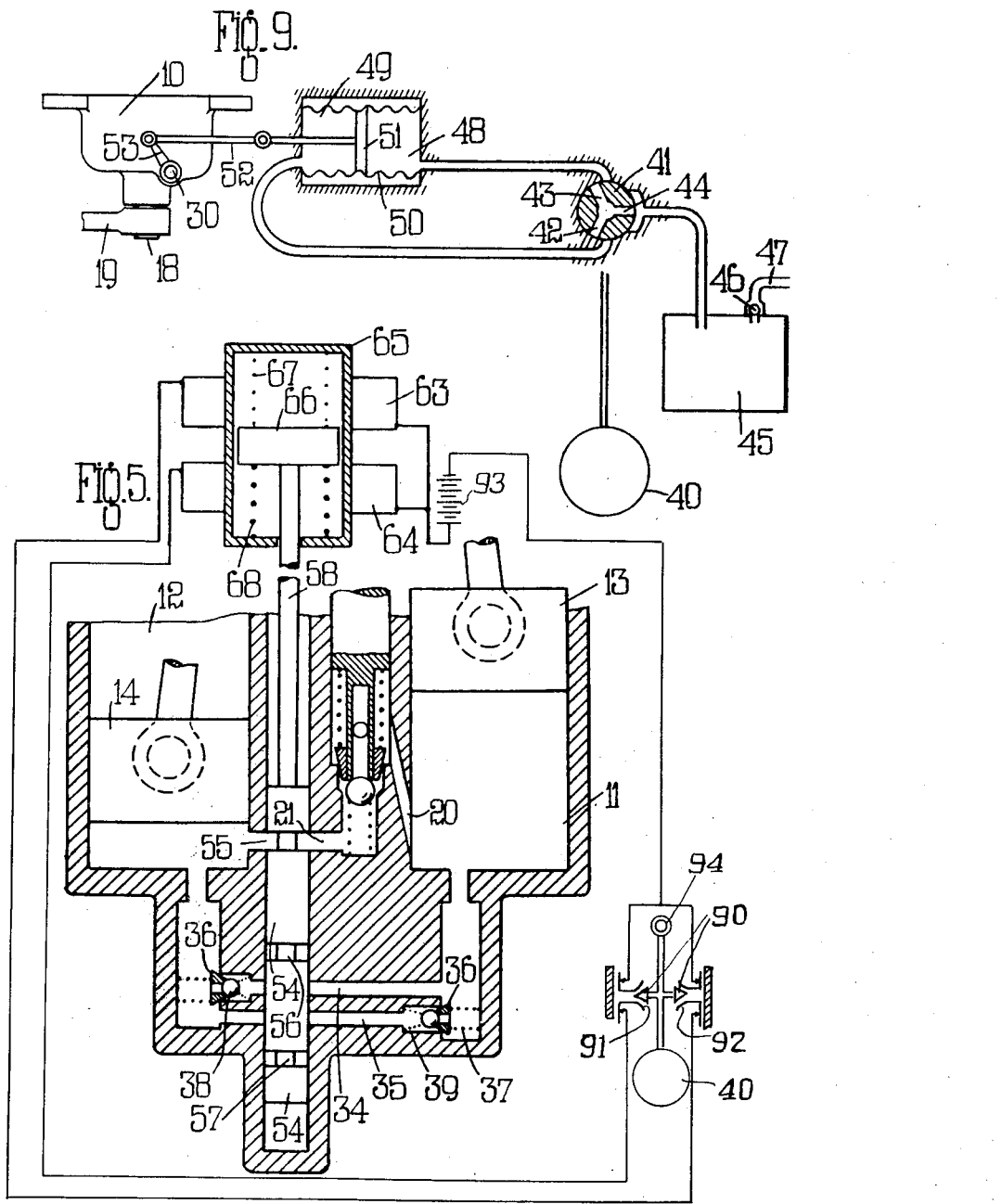

Dec. 5, 1939.  F. G. G. ARMSTRONG  2,182,271
HYDRAULIC SHOCK ABSORBER AND THE LIKE DAMPING MEANS
Filed May 23, 1938   3 Sheets-Sheet 3
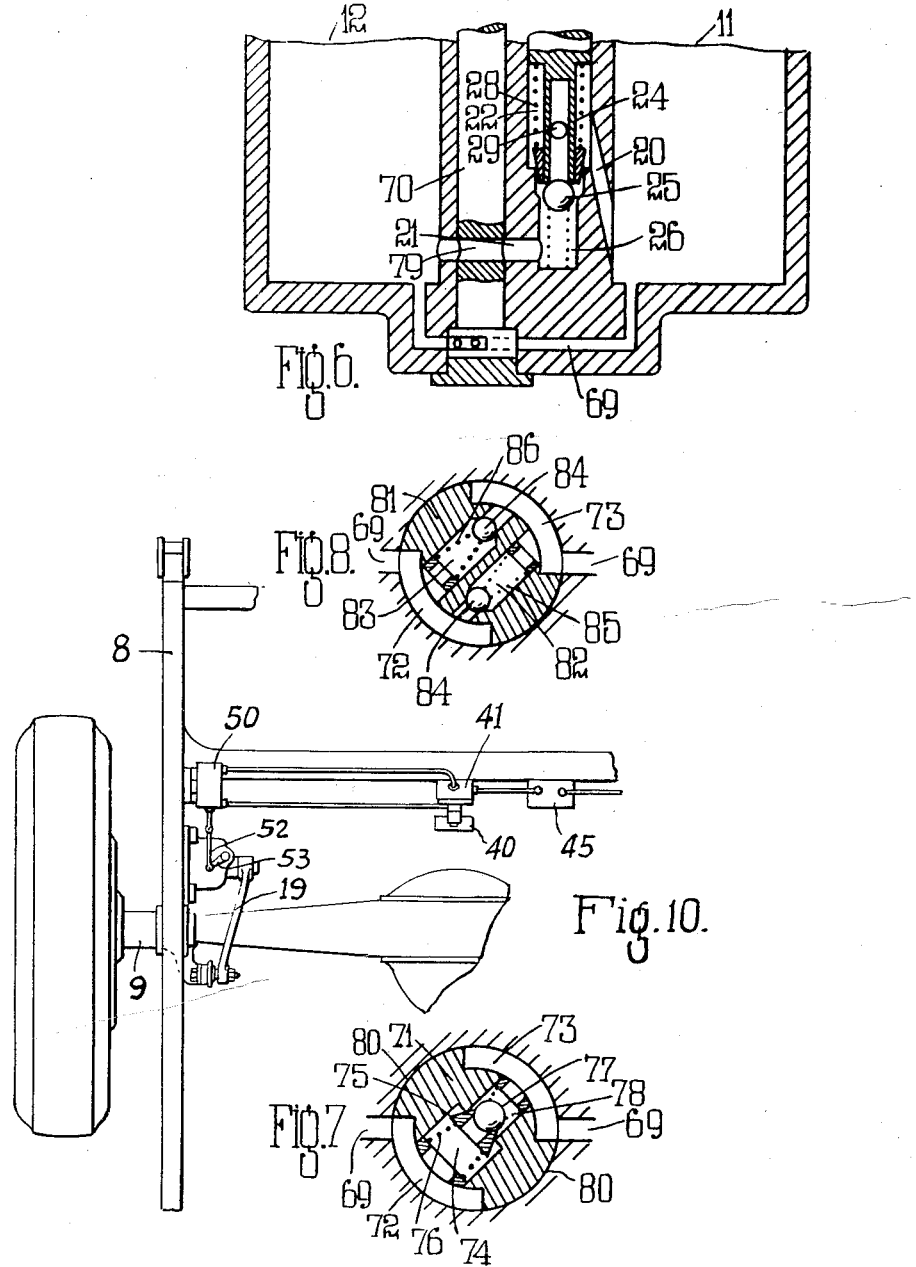

Patented Dec. 5, 1939

2,182,271

UNITED STATES PATENT OFFICE 2,182,271

HYDRAULIC SHOCK ABSORBER AND THE LIKE DAMPING MEANS

Fullerton George Gordon Armstrong, Beverley, England

Application May 23, 1938, Serial No. 209,623
In Great Britain December 31, 1936

3 Claims. (Cl. 188—88)

The present invention relates to hydraulic shock absorbers and the like differential pressure operated damping means of the type wherein a resistance to relative displacement between two elements such as, for example, a vehicle body and a wheel axle, is effected by resisting fluid flow between a pair of piston chambers in the shock absorber or the like damping means, constituted by separate cylinders in each of which a piston is displaceable.

According to the present invention, the chambers are hydraulically interconnected by two or more conduits, one of which is available to fluid flow when one of the two elements to be damped remains horizontal or at a predetermined angle to the other element, and the other or others are available to fluid flow according to the direction of tilt or tendency to tilt of one element relatively to the other.

Where two conduits are available to fluid flow a greater resistance to flow in either direction than in the opposite direction is automatically produced according to the direction of tilt or tendency to tilt.

In one construction according to the present invention, the chambers are hydraulically interconnected by three conduits, one of which only is available for fluid flow when one of the two elements whose relative displacement is to be damped lies horizontal and the other two of which are separately available to fluid flow according to that direction in which said element tilts or tends to tilt from the horizontal position, that is to say, when the element tilts or tends to tilt in one direction the second conduit only is available to fluid flow, whilst in the opposite direction the third conduit only is available to fluid flow.

Further, by the present invention, a differential resistance is available to fluid flow in one or more of the conduits considered separately, that is to say, resistance to fluid flow in one direction along each conduit may be different from the resistance to flow in the opposite direction along the same conduit.

Where the hydraulic shock absorber or the like differential pressure operated damping means of the present invention is utilised for damping relative displacement of a vehicle body with a wheel axle, it will thus be seen that no matter whether the vehicle is travelling with the chassis horizontal or is cornering in either direction with the chassis tilted or tending to tilt under the action of centrifugal force, a greater resistance to fluid flow may be available in one direction between the piston chambers than in the other, thereby offering considerable resistance to tilting and a smaller resistance to fluid flow caused by the vehicle meeting an obstruction in the road while cornering.

A further feature of the present invention resides in the provision of pendulum or inertia mass means adapted for displacement under the action of centrifugal force or on tilting of the element on which said means is mounted, so as to isolate two of the conduits at a time, thereby leaving one conduit only available for fluid flow between the piston chambers.

The pendulum, inertia mass or the like means may operate a spindle having three spaced transverse bores therein which spindle is longitudinally displaced by the pendulum or inertia mass means according to the position of the latter, transversely across the three conduits, the spacing of the bores in the spindle being such that only one bore synchronises with the conduit at any time.

Again, if desired, two conduits only may be provided one for use when one element is parallel or lies at a predetermined angle relatively to the other during tendency to the elements for relative displacement and the second for use when relative displacement between elements includes tilting or is accompanied by any tendency to tilt. In such event, the valve spindle is displaceable between two positions only and in such displacement the second position for controlling the flow through the second conduit, the valve is adapted to prevent a greater resistance to flow in one direction than in the opposite direction when the elements tend to tilt in a clockwise direction and to prevent a greater resistance to flow in the latter direction than in the former, when the elements tend to tilt in an anti-clockwise direction.

The invention is more particularly described with reference to the accompanying drawings, in which:—

Figure 1 is a vertical section through a shock absorber of the type to which the present invention is applied.

Figure 2 is a longitudinal section through part of the shock absorber of Figure 1 showing the relative positions between the cylinders and the spindles for controlling the conduits between said cylinders.

Figure 3 is a diagrammatic vertical section through the lower part of a shock absorber showing one form of construction of the present invention applied thereto, and wherein a setting spindle is adapted for angular rotation about its axis to control the conduits between the cylinders.

Figure 4 is a vertical section through the shock absorber of Figure 3 associated with a suitable form of construction for displacing the setting spindle longitudinally to effect control of the conduits between the shock absorber cylinders.

Figure 5 is a diagrammatic section through a shock absorber similar to that of Figure 3, but showing a modified form of construction for operating the setting spindle.

Figure 6 is a modified form of construction showing diagrammatically the lower part of a shock absorber with two conduits only under the control of a setting spindle between the cylinders which is angularly rotated about its axis to control the conduits.

Figure 7 is an enlarged transverse sectional view of the lower end of the spindle of Figure 6.

Figure 8 is an enlarged transverse sectional view of the lower end of a modified form of spindle used with the two-passage construction of Figure 6.

Figure 9 is a diagrammatic view of a suitable form of mechanism for effecting angular rotation of the setting spindle suitable for use in the constructions according to Figures 3 and 6–8.

Figure 10 is a diagrammatic view showing the mounting of the parts of the shock absorber on the displaceable elements.

In considering the drawings it should be appreciated that the present invention is not fully disclosed in Figures 1 and 2, that is to say, Figures 1 and 2 merely assist in indicating the precise relationship between the positions of the cylinders and the setting spindle for controlling the conduits between said cylinders. In other words, in the actual construction of shock absorber according to Figures 3, 4, 5 and 6, the setting spindle is not disposed in a vertical plane containing the vertical axes of the cylinders, but is disposed to one side of said plane as represented in Figure 2. Figures 1 and 2, therefore, are included herein to simplify the drawings utilised in describing the invention, and to indicate that Figures 3, 4, 5 and 6 are not true vertical sections through the vertical axes of the cylinders.

In the constructions according to the drawings the shock absorber casing 10 has a pair of cylinders 11, 12, and where road vehicles are concerned, said casing is adapted to be mounted rigidly on the chassis 8 of the vehicle, which constitutes one of the elements whose relative movement is to be damped. Pistons 13, 14 are connected by links 15, 16, respectively with a crank 17 which is mounted for rotation with a shaft 18 of the shock absorber which is connected by a link 19 either directly to or through further linkage with the other element of the pair to be damped, which in the case of a vehicle may constitute one of the wheels or the wheel axle 9 (Fig. 10).

As in the constructions described in United States Patents Nos. 2,117,644, 2,117,645 and 2,117,646, communication is established between the piston cylinders 11 and 12 of the shock absorber through a conduit comprising passages 20, 21 and a longitudinal bore 22 in the casing of the shock absorber. In this bore is mounted a spindle 23 having a hollow and relatively narrow end 24 on which is seated a ball 25, loaded by a relatively light spring 26. A tapered annular ring 27 surrounds the extreme end of the hollow portion 24 of the spindle and is resiliently loaded by a relatively strong spring 28; the part 24 is transversely bored at 29. Thus, on downward displacement of the piston 13 under normal circumstances, i. e., when a vehicle is travelling along a road without any inclination to tilt, and a wheel or wheels encounter an obstruction in the road, the pistons 13, 14, are displaced in their cylinders on displacement of the link 19 and the crank 17 to cause fluid to pass between the cylinders 11 and 12. When the piston 13 descends on its compression stroke fluid is forced through the passage 20 into the bore 22, through the bore 29 into the interior of the hollow end 24 of the spindle 23 and forces the ball 25 off its seat against the load created by the spring 26 whereby the fluid enters the passage 21 and thence into the cylinder 12.

On reverse displacement of the pistons 13, 14, that is to say, on the upward stroke of the piston 13 and the downward stroke of the piston 14, the fluid leaves the cylinder 12, enters the passage 21 and being unable to open the ball valve, forces the tapered annulus 27 upwardly against its spring 28, so that the fluid enters the bore 22 and thus passes through the passage 20 into the cylinder 11. As the ball valve 25 and the annulus 27 are unequally loaded, it will be seen that there is a differential resistance to fluid flow in opposite directions of piston displacement.

By the present invention, additional means are provided to control the displacement of the pistons in the event of the vehicle tilting or tending to tilt and in the construction according to Figure 3, such means includes the provision of a setting spindle 30 which has transverse bores 31, 32, 33, formed therein. The transverse bore 31 in one position of angular displacement of the setting spindle 30 is adapted to open the passage 21. In another position of angular displacement of the spindle 30, a conduit 34 between the cylinders 11 and 12 is opened by the transverse bore 32, whilst in a third position of angular displacement of the spindle 30 a third conduit 35 between the cylinders 11 and 12 is opened by the transverse bore 33 of the spindle. In other words, the transverse bores 31, 32, 33, extend in different directions, radially of the spindle and when any one bore opens its conduit the other two conduits are closed.

Both the left hand end of the conduit 34 and the right hand end of the conduit 35 (Figure 3) have a tapered annulus 36 resiliently loaded by a relatively strong spring 37 and a ball valve 38 resiliently loaded by a relatively light spring 39. As a result when the conduit 34 is open at a predetermined angular position of the spindle 30 causing the bore 32 therein to lie co-axial or substantially co-axial with the conduit 34, fluid from the cylinder 11 can enter the cylinder 12 on displacement of the pistons by raising the tapered annulus 36 off its seat against the relatively heavy load but on reverse direction of displacement of the pistons, fluid from the cylinder 12 can pass into the cylinder 11 by forcing the ball 38 against its relatively light load off its seat. Thus, there is a greater resistance to downward movement of the piston 13 on opening of the conduit 34 than exists on downward movement of the piston 14, whilst the opposite result takes place when the conduit 35 is opened, that is to say, a greater resistance is applied to the compression stroke of the piston 14 than to the piston 13.

As the angular displacement of the spindle 30 can be controlled by a pendulum or inertia mass pivotally supported on the vehicle, it will be seen that whether the vehicle remains horizontal or in any predetermined position relatively to the wheels or is accompanied by a tendency to tilt or tilting, in either direction from said predetermined position, a differential resistance to fluid flow is created.

Accordingly, should the vehicle tend to tilt in one direction such as for example, on cornering and the conduit 34 and the passages 20, 21, are closed leaving the conduit 35 open, the resistance to tilt is created by the valve 36, whilst should the vehicle meet an obstruction in the road while cornering, the smaller the resistance to movement of the shock absorber parts due to such obstruction in the opposite direction is resisted by the spring loaded valve 38. In other words, not only does the shock absorber provide a resistance to displacement of the shock absorber parts under ordinary circumstances when the vehicle is travelling in a direct line along a road and meets an obstruction, which circumstances are controlled by the valves associated with the passage 20, 21, but in addition tilting or tendency to tilt in one direction is controlled by the heavily loaded valve of the conduit 34 and in the other direction by the heavily loaded valve in the conduit 35, whilst during said tilting or tendency to tilt, any displacement due to the vehicle meeting an obstruction in the road is resisted by the relatively lightly loaded valves 38 in the conduits 34, 35, according to whether the vehicle is taking a right hand or a left hand curve.

In the construction according to Figure 9 which shows a suitable form of mechanism for angularly rotating the spindle 30, a pendulum or inertia mass 40 is keyed to an oscillating valve 41 having passage-ways 42, 43, 44 therein. This oscillating valve 41 is adapted to establish communication between a vacuum tank 45 having a non-return valve 46 controlling its communication 47 with the induction pipe of the engine and either side 48, 49 of bellows 50 according to the position taken up by the valve 41. The bellows has a partition 51 formed therein which has a link connection 52 with a lever 53 connected with the upper end of the spindle 30. As a result, when the pendulum or inertia mass 40 remains vertical the bellows 50 is isolated from the suction tank 45 leaving the partition disposed centrally of the bellows, in which case the bore 31 of the spindle opens the passage 21. When, however, the pendulum 40 moves to one side due to tilting of the vehicle, one or other of the passages 42, 43, is adapted to establish connection with one side of the bellows to force this to the right or left as the case may be and thus angularly displace the lever 53 and the setting spindle 30 into such a position as to bring either the bore 32 co-axial with the conduit 34 or the bore 33 co-axial with the conduit 35.

In the modified form of construction illustrated in Figure 4, a longitudinally displaceable setting spindle 54 is substituted for the angularly displaceable setting spindle 30. Accordingly, the spindle is provided with three neck portions 55, 56, and 57, which, in accordance with the degree of longitudinal displacement of the spindle is adapted to open either the passage 21, the conduit 34 or the conduit 35.

In the construction according to Figure 4 the upper end of the spindle is connected by a rod 58 with the partition 59 of a bellows 60, the partition being displaceable according to whether a passage 61 or a passage 62 to the bellows on opposite sides of the partition 59 are placed in communication by an oscillating valve of the type shown in Figure 9 with the suction tank 45.

A similar type of longitudinally displaceable setting spindle is shown in the construction according to Figure 5, but in this case the pendulum or inertia mass 40 is adapted to control the circuit of a pair of field windings 63, 64, of a solenoid 65, the armature 66 of which is connected by a rod 58 with the setting spindle 54. For this purpose, the field winding 63 lies in a circuit containing a battery 93 and a switch 92, while the field winding 64 lies in the circuit of the battery and a switch 91. The pendulum 40 is adapted to swing about a horizontal pivot 94 which extends longitudinally of the vehicle body and preferably at a position centrally of the width of the body, that is, remote from the shock absorber. This pendulum carries a pair of contacts 90 both of which are out of engagement with the switch contacts 91, 92 so long as the pendulum remains vertical, that is, so long as the vehicle body remains horizontal during its line of travel. In this position, the armature 66 is maintained centrally of the solenoid under control of the springs 67, 68, and the field windings 63, 64 are de-energised. When, however, the vehicle tends to tilt in either direction one or the other of the windings 63, 64, is energised by movement of the pendulum 40 with its contacts 90 into engagement with the switch contact 91 on the switch contact 92 to attract the armature 66 and thus displace the setting spindle 54 to its required position for opening the required conduit 34 or 35. It is obvious that this single pendulum 40 may be employed for energising the field windings of a plurality of shock absorbers, that is, where a vehicle is provided with two or four shock absorbers only one pendulum is required for operating the setting spindle of each.

In the modified form of construction illustrated in Figure 6, the conduits 34, 35, are replaced by a single conduit 69 in which event the lower end of the spindle is constructed in accordance with Figure 7 or 8, the spindle in this case being angularly rotated about its own axis as in the construction according to Figure 3. In this construction the passage 21 is maintained open by the setting spindle 70 when the vehicle is travelling in a straight line and the passage 69 is maintained closed. When, however, the vehicle tilts or tends to tilt the spindle 70 is rotated in either one direction or the other according to the direction of tilt, to open the passage 69 and close the passage 21.

In the construction according to Figure 7, the lower end of the spindle 70 is constructed as a valve 71 having diametrically opposed arcuate recesses 72, 73, on its periphery. The valve 71 also has a transverse bore 74 formed therein which is of varying diameter throughout its length, a tapered annulus 75 under a relatively heavy load created by a spring 76 constituting the resistance to fluid flow in one direction through the bore 74 and a ball valve 77 loaded by a relatively light spring 78 constituting the resistance to fluid flow in the opposite direction through said bore.

It will thus be seen that when the bore 79 in the spindle 70 opens the passage 21, the conduit 69 can be wholly closed in that the peripheral faces 80 of the valve cover the ends of the conduit 69. When, however the spindle 70 is angularly displaced into the position shown in Figure 7, the passage 21 is closed by bringing the bore 79 to a position out of coincidence therewith whilst fluid from the cylinder 11 enters the arcuate recess 73 and passes through the bore 74, against the relatively heavy load created by the annular valve 75 and its spring. During the tilting in this direction, should the vehicle meet an obstruction in the road, and the piston 14 caused to descend, fluid from the piston 12 enters the arcuate recess 72 and passes through the bore 74 against the relatively lightly loaded valve 77.

On tendency to tilt in the opposite direction due to the vehicle traversing a corner of opposite curvature, the valve is rotated in the opposite direction to bring the arcuate passage 73 in communication with the left hand end of the passage 69 in which case resistance to fluid flow between the cylinders is reversed with the greater resistance operable against tilting and a lesser resistance operable against movement of the parts due to meeting an obstruction in the road.

In the construction according to Figure 8, the spindle 70 has a valve 81 formed in its lower end with arcuate recesses 72, 73. In this case a pair of transverse bores 82, 83 are provided having valves 84, loaded by springs 85, 86. In this case the spring 86 is stronger than the spring 85.

It will be seen that the construction according to Figure 8 produces the same results as that according to Figure 7, the only difference being that two transverse bores are provided in the valve 81 instead of one, each with a single resistance to fluid flow, said resistance being differential in that one is greater than the other.

In Fig. 10 of the accompanying drawings, the various parts of the shock absorber system are shown in their relation to a vehicle chassis 8 and wheel axle 9 which constitute the elements whose relative displacement is to be damped. Thus, the inertia mass 40, the valve 41, the vacuum tank 45 and the bellows 50 are shown mounted in relation to the shock absorber.

It is to be clearly understood that minor changes in the details of construction and arrangement of parts may be made without departing from the scope of the invention as set forth in the appended claims.

I declare that what I claim is:

1. The combination with a pair of relatively displaceable elements on a vehicle, of means for damping the relative displacement of said elements, comprising a casing adapted to be connected to one of the pair of elements whose relative displacement is to be damped, a shaft connected to the other element of said pair, a pair of pistons displaceable by said shaft, a pair of piston chambers within which said pistons are displaceable, a plurality of spaced conduits between said chambers, one of which is available to fluid flow when one of the two elements to be damped remains horizontal or at a predetermined angle to the other element, and another of which is available to fluid flow according to the direction of tilt or tendency to tilt of one element relatively to the other, and a spindle having relatively inclined radial bores at longitudinally spaced parts equal to the spacing apart of the conduits, and means to rotate said spindle about its axis to isolate at any time all conduits but one in maintaining fluid flow between said chambers.

2. The combination with a pair of relatively displaceable elements on a vehicle, of means for damping the relative displacement of said elements, comprising a casing adapted to be connected to one of the pair of elements whose relative displacement is to be damped, a shaft connected to the other element of said pair, a pair of pistons displaceable by said shaft, a pair of piston chambers within which said pistons are displaceable, a plurality of spaced conduits between said chambers, one of which is available to fluid flow when one of the two elements to be damped remains horizontal or at a predetermined angle to the other element, and another of which is available to fluid flow according to the direction of tilt or tendency to tilt of one element relatively to the other, a spindle having relatively inclined radial bores at longitudinally spaced parts equal to the spacing apart of the conduits, means to rotate said spindle about its axis to isolate at any time all conduits but one in maintaining fluid flow between said chambers, and non-return valve means in one of said radial bores for regulating fluid flow therethrough in opposite directions.

3. The combination with a pair of relatively displaceable elements on a vehicle, of means for damping the relative displacement of said elements, comprising a casing adapted to be connected to one of the pair of elements whose relative displacement is to be damped, a shaft connected to the other element of said pair, a pair of pistons displaceable by said shaft, a pair of piston chambers within which said pistons are displaceable, a plurality of spaced conduits between said chambers, one of which is available to fluid flow when one of the two elements to be damped remains horizontal or at a predetermined angle to the other element, and another of which is available to fluid flow according to the direction of tilt or tendency to tilt of one element relatively to the other, a spindle having relatively inclined radial bores at longitudinally spaced parts equal to the spacing apart of the conduits, means to rotate said spindle about its axis to isolate at any time all conduits but one in maintaining fluid flow between said chambers, non-return valve means in at least one of said radial bores for regulating fluid flow therethrough in opposite directions, and a resilient load on each valve means, said load on one valve in each bore being greater than that on an oppositely opening valve in said bore to provide a differential resistance to fluid flow in opposite directions therethrough.

FULLERTON GEORGE GORDON ARMSTRONG.